(12) United States Patent
Oren

(10) Patent No.: US 7,136,350 B1
(45) Date of Patent: Nov. 14, 2006

(54) EFFICIENT SUPPORT FOR VP/VC GROUPS

(75) Inventor: Yair Oren, Tel-Aviv (IL)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/030,377

(22) PCT Filed: Jan. 3, 2000

(86) PCT No.: PCT/US00/00032

§ 371 (c)(1),
(2), (4) Date: Oct. 26, 2001

(87) PCT Pub. No.: WO01/05103

PCT Pub. Date: Jan. 18, 2001

Related U.S. Application Data

(60) Provisional application No. 60/143,402, filed on Jul. 12, 1999.

(51) Int. Cl.
*G06F 11/00* (2006.01)
(52) U.S. Cl. ................. 370/228; 370/397; 370/395.32; 370/400
(58) Field of Classification Search ................ 370/225, 370/397, 407, 396, 429, 395.31
See application file for complete search history.

(56) References Cited

U.S. PATENT DOCUMENTS

| | | | |
|---|---|---|---|
| 5,671,215 A * | 9/1997 | Foglar | 370/227 |
| 5,689,499 A | 11/1997 | Hullett et al. | |
| 5,715,237 A * | 2/1998 | Akiyoshi | 370/228 |
| 5,809,501 A * | 9/1998 | Noven | 707/7 |
| 5,838,924 A * | 11/1998 | Anderson et al. | 709/239 |
| 5,884,297 A * | 3/1999 | Noven | 370/395.3 |
| 6,044,079 A * | 3/2000 | Calvignac et al. | 370/395.32 |
| 6,151,325 A * | 11/2000 | Hluchyj | 370/398 |
| 6,282,171 B1* | 8/2001 | Adams et al. | 370/229 |
| 6,301,254 B1* | 10/2001 | Chan et al. | 370/397 |
| 6,353,593 B1* | 3/2002 | Chen et al. | 370/216 |
| 6,538,987 B1* | 3/2003 | Cedrone et al. | 370/216 |
| 2002/0075798 A1* | 6/2002 | Sekine et al. | 370/228 |

* cited by examiner

*Primary Examiner*—Hassan Kizou
*Assistant Examiner*—Brian Roberts

(57) ABSTRACT

A method for supporting VP/VC groups in asynchronous transfer mode (ATM) switching systems that implement ATM automatic protection switching (APS). A source (SA) transmits traffic substantially continuously on two paths and a destination (SB), or sink, selects at any time one of the traffic from only one of the paths for further processing. The method includes creating a groups table having an entry for each of the two instances of every active VP/VC group's member set. Each entry indicates whether the cells for that instance of the member circuits of that VP/VC group should be forwarded or discarded. Each entry references a corresponding entry in the groups table by means of a pointer. The method includes accessing a relevant entry in the groups table when a cell for that circuit arrives, discarding the cell if the accessed value is "discard," and forwarding the cell as specified in the specific lookup table entry for that circuit if the accessed value is otherwise. Protection switching for a group requires only changing the value of the corresponding two entries in the groups table, a single operation regardless of the number of member circuits in the group.

6 Claims, 1 Drawing Sheet

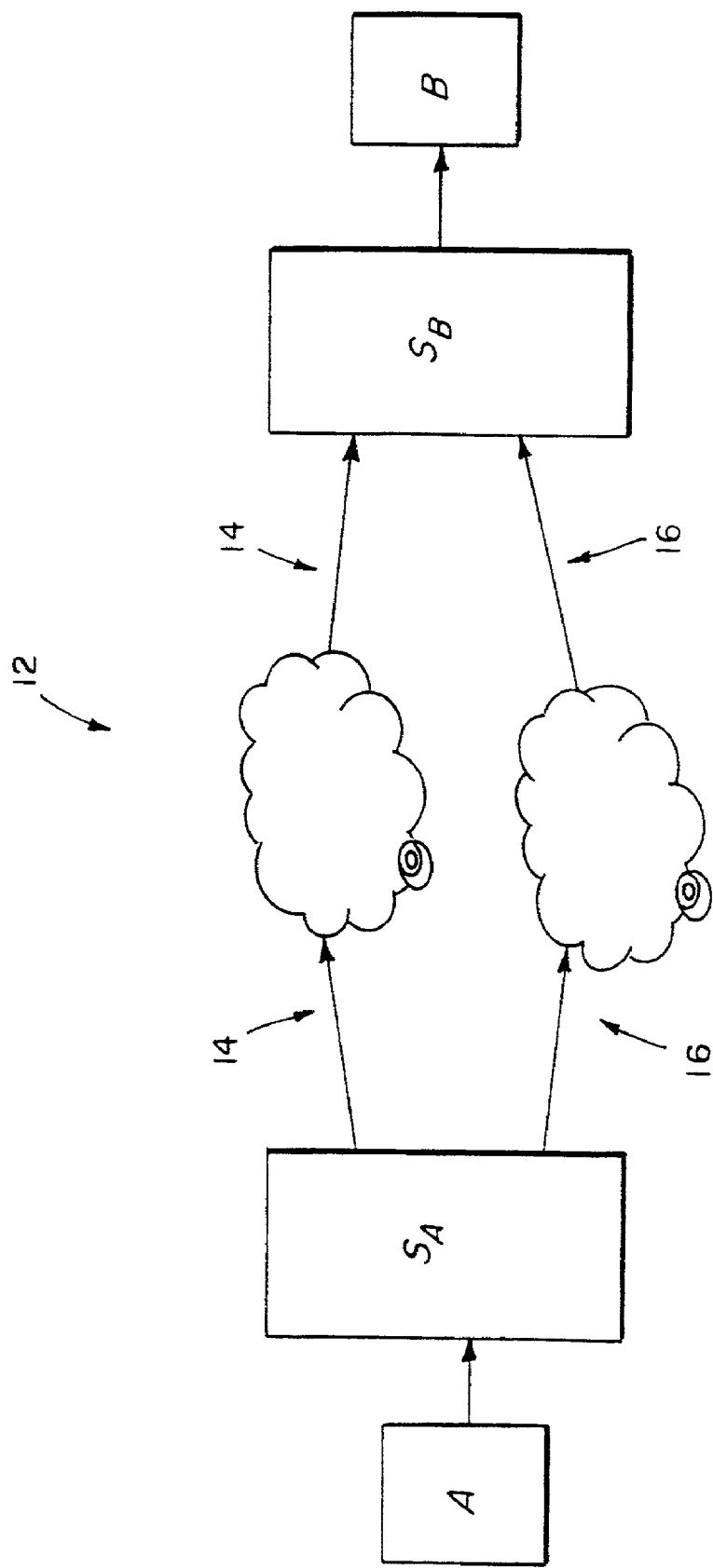

EFFICIENT SUPPORT FOR VP/VC GROUPS

CROSS-REFERENCES TO RELATED APPLICATIONS

This application is a U.S. national counterpart application of international application serial No. PCT/US00/00032 filed Jan. 3, 2000, which claims priority to U.S. provisional application Ser. No. 60/143,402 filed Jul. 12, 1999.

FIELD OF THE INVENTION

This invention relates to protection of networks in the event of physical faults in the networks, such as breaks in network connections. It is disclosed in the context of an efficient method for supporting virtual path/virtual channel (VP/VC) groups in asynchronous transfer mode (ATM) switching systems that implement ATM automatic protection switching (APS). However, the invention is believed to be useful in other applications as well.

BACKGROUND OF THE INVENTION

ATM APS is described in the 1.630 specification of the International Telecommunications Union (ITU-T). ATM APS provides a mechanism for quick recovery from physical faults, akin to APS mechanisms used in synchronous optical networks (SONETs). The protected entity in this case is an ATM VP or VC circuit. A description of ATM APS as specified by ITU-T specification 1.630 will aid in understanding the invention.

Referring to FIG. 1, consider an ATM network with arbitrary topology, and an ATM circuit (either VPC or VCC) extending from a node A to a node B, where node A is connected to a switching system $S_A$ and node B is connected to a switching system $S_B$. In the context of traffic flow from A to B, the protection domain for this circuit extends from $S_A$ to $S_B$. $S_A$ is sometimes referred to as the source for the protection domain of the circuit. $S_B$ is sometimes referred to as the sink for the protection domain of the circuit. Other nodes on the paths between source and sink are sometimes referred to as intermediate nodes along the protected circuit.

ITU-T specification 1.630 describes two different types of protection, so-called "1+1" protection, in which the source transmits (multicasts) the traffic constantly on both paths and the sink selects at any time one of the incoming traffic streams and forwards it to the egress, and so-called "1:1" protection, in which the source transmits the traffic on only one of the paths. When that path becomes disconnected, the source switches to transmit on the alternate path. An intermediate node that senses a problem on its associated path notifies the sink node using the AIS operations and maintenance (OAM) cell. The sink then effects a protection switch (1+1 protection) or notifies the source that the source should switch to the alternate path (1:1 protection).

DISCLOSURE OF THE INVENTION

According to the invention, a method is provided for supporting VP/VC groups in ATM switching systems that implement ATM APS in which traffic flows substantially continuously from a source on two paths and a destination selects traffic from only one of the paths at a time for further processing. The method includes creating a groups table having an entry for each of the two instances of every active VP/VC group's member set. Each entry indicates whether the cells for that instance of the member circuits of that VP/VC group should be forwarded or discarded. Each entry references a corresponding entry in the groups table by means of a pointer. The method includes accessing a relevant entry in the groups table when a cell for that circuit arrives, discarding the cell if the accessed value is "discard," and forwarding the cell otherwise. Protection switching for a group thus requires only changing the values of the corresponding two entries in the groups table, a single operation regardless of the number of member circuits in the group.

Illustratively according to the invention, forwarding the cell includes maintaining a lookup table containing entries for forwarding cells, and forwarding the cell as specified in the specific lookup table entry for that circuit.

Further illustratively according to the invention, creating the groups table includes implementing the groups table as part of the circuitry of the switching system.

Additionally illustratively according to the invention, the method includes determining the number of supported groups in part based upon the size of the groups table.

Illustratively according to the invention, the method includes determining the number of supported groups in part based upon the number of bits allocated to the groups table pointer in the lookup table entry.

Further illustratively according to the invention, accessing a relevant entry in the groups table when a cell for that circuit arrives includes accessing a relevant entry in the groups table when a non-zero value of the pointer field arrives.

Additionally illustratively according to the invention, accessing a relevant entry in the groups table when a cell for that circuit arrives includes determining that VC circuit's or VP circuit's forward/discard status should be determined from the lookup table entry itself when a value of zero in the pointer field arrives, indicating that the corresponding VC circuit or VP circuit is not a member of a group.

BRIEF DESCRIPTION OF THE DRAWINGS

The invention may best be understood by referring to the following detailed description and accompanying drawing which illustrates the invention. The drawing is a highly diagrammatic illustration of a system incorporating the invention.

DETAILED DESCRIPTIONS OF ILLUSTRATIVE EMBODIMENTS

Referring now to the drawing, in the context of 1+1 protection, there is a need for a mechanism by which any failure in the network 12 connecting $S_A$ to $S_B$ will not disrupt the traffic flow between A and B. In order to achieve that, two diverse paths, or circuits, 14, 16 in the network 12 need to be established between $S_A$ and $S_B$. If one of the paths 14, 16 is disconnected, traffic can still flow through the other path. Protecting each circuit between a source and a sink individually works well when the number of circuits is relatively small. When the number of circuits is very large, for example, in the tens of thousands, monitoring each circuit for AIS notifications and protection switching consumes substantial network 12 capacity. In many networks 12, many circuits follow the same path in the network 12 from end to end, and are thus similarly affected by any network fault. For these reasons, ITU-T specification 1.630 groups circuits into VP/VC groups.

A VP/VC group is a set of VP circuits (VPCs) and VC circuits (VCCs—both VCCs and VPCs may be members of the same set) which are all associated with a specific APS VCC. The two instances of the APS VCC of the group follow the same end-to-end paths as the protected circuits (from source to sink) and in particular traverse the same intermediate nodes. When such an intermediate node detects a problem affecting the circuits associated with the VP/VC group, that intermediate node notifies the sink by sending an AIS OAM cell on the corresponding APS VCC. When the sink receives such a problem indication on the APS VCC of a specific VP/VC group, the sink effects a protection switching for all member circuits of that VP/VC group. Therefore, the sink node only needs to monitor the APS VCCs of the different VP/VC groups for AIS indications.

ATM switching systems generally incorporate the ability to use the virtual path identifier/virtual channel identifier (VPI/VCI) value of each incoming ATM cell to look up an entry in a lookup table corresponding to this VPC or VCC. There may physically be several lookup tables, for example, one per input port. However, their concatenation can logically be considered as a single lookup table. This entry in the lookup table determines, among other things, how the cell should be handled, for example, whether the cell should be forwarded or discarded, and, if the decision is that the cell should be forwarded, to which output port of the switch, SB for example, it should be forwarded.

The sink node of a 1+1 protected ATM circuit has two incoming "copies" of the protected circuit, each on a different port. Each such copy is mapped to a different entry in the lookup table, and both of those entries route the incoming cells to the same outgoing circuit, for example, the circuit to node B. At any time, one of the entries for the incoming circuits will have the cells forwarded while the other entry will have them discarded. This results in having the cells from one copy of the incoming circuit forwarded to the output, and the cells from the other copy being discarded. A protection switching operation for this circuit thus changes the tagging in one entry from "forward" to "discard" and changes the tagging in the other entry from "discard" to "forward."

This manipulation of the lookup table entries can be carried out by a software process in the switch processor, which also determines if a protection switching operation is required in the first place. If the event that triggered the protection switching operation affects relatively few circuits, the processing time required to update the relevant lookup table entries is relatively small. However, when the event requires a protection switching operation for a large group of VCCs or VPCs, the required processing time may be excessive. A hardware-based mechanism can speed up the effecting of a protection switching operation for a VP/VC group.

In order to support VP/VC groups efficiently, it is desirable that whenever the forward/discard status of a group changes, that that change be reflected in a single entry and not in the entry of every member circuit. This is achieved by creating a groups table that has two entries for every active group, one for each of the two instances of that group's member set. The entry specifies whether the cells for that instance of the member circuits of that group should be forwarded or discarded. The entry in the lookup table for each individual circuit references the corresponding entry in the groups table by means of a pointer. When a cell for that circuit arrives, the relevant entry in the groups table is accessed. If the accessed value is "discard," the cell is discarded. Otherwise, the cell is forwarded as specified in the specific lookup table entry for that circuit.

Thus a protection switching operation for a group requires only changing the value of the corresponding two entries in the groups table, a single operation regardless of the number of member circuits in the group. The groups table is implemented as part of the hardware circuitry of the switching system. The number of supported groups is arbitrary, and is determined by the size of the groups table and the number of bits allocated to the groups table pointer in the lookup table entry. This mechanism also supports VCCs or VPCs that are not members of any group. Specifically, a value of zero in the pointer field of the lookup table entry indicates that the corresponding VCC or VPC is not a member of a group, and that that VCC's or VPC's forward/discard status should be determined from the lookup table entry itself. Any other value of the pointer field constitutes a valid index into the group table.

The invention claimed is:

1. A method for supporting virtual path/virtual channel (VP/VC) groups in asynchronous transfer mode (ATM) switching systems that implement ATM automatic protection switching (APS) in which traffic flows from a source on two paths and a destination selects traffic from only one of the paths at a time for further processing, the method comprising:

creating a groups table, the groups table having an entry for each of the two paths of every active VP/VC group, each active VP/VC group having an associated set of member circuits, each entry indicating whether the cells for that path of that VP/VC group should be forwarded or discarded, each entry referenced by means of a pointer field;

accessing a relevant entry in the groups table when a cell arrives on one of the two paths, the relevant entry associated with the one of the two paths, the relevant entry including a status value; and discarding the cell if the status value is indicative of a discard status or forwarding the cell if the status value is not indicative of the discard status.

2. The method of claim 1, wherein forwarding the cell comprises:

maintaining a lookup table including a lookup table entry for each circuit in the set of member circuits of each VP/VC group for forwarding cells; and forwarding the cell as specified in the lookup table entry for that circuit.

3. The method of claim 2, wherein a number of supported groups is determined in part by a number of bits allocated to the pointer field associated with the circuit for the cell.

4. The method of claim 1, wherein a value of zero in the pointer field of the groups table indicates that the corresponding VC circuit or VP circuit is not a member of any of the VP/VC groups, and that a forward/discard status of the respective circuit is stored in a lookup table entry associated with the circuit.

5. The method of claim 1, wherein the groups table is implemented as part of a module of the switching system.

6. The method of claim 1, wherein a number of supported VP/VC groups is determined in part by a size of the groups table.

* * * * *